Patented Apr. 14, 1942

2,280,024

UNITED STATES PATENT OFFICE 2,280,024

METHOD OF PRESERVING

Robert H. Bedford, New York, N. Y., assignor to The Atlantic Coast Fisheries Company, New York, N. Y., a corporation of Maine No Drawing. Application July 7, 1938, Serial No. 217,923

13 Claims. (Cl. 99—160)

This invention relates to the process of preserving perishable tissues containing vitamin-bearing oils in such a manner that the tissues bearing the oils lend themselves to efficient methods of separation of the oil and the oil produced therefrom retains its vitamins as well as its wholesomeness and purity when extracted. This invention relates more particularly to the preservation of the viscera of fish, including liver, intestines and other organs of the fish which contain vitamin-bearing oils, and also the product resulting therefrom.

Prior to this invention, it has been customary in the case of cod livers to bring the livers into port from very short trips or else to try out the oil at sea, both procedures contemplating the extraction of oil while the livers are strictly fresh. Codfish livers are exceedingly perishable and, if the oil is not extracted immediately from the strictly fresh livers, bacterial and enzyme action splits the glycerides in the cod liver oil to fatty acids and glycerine, while the bacterial and other enzyme action gives a darkening of color, development of foul odors and taste, and deterioration of vitamin potency. In the case of longer fishing trips at sea, such as those in the halibut fishing, it is not practicable to return to port promptly because of the great distance of the fishing grounds from port, so that advantage cannot be taken of short trips for avoiding decomposition. On the other hand, in the case of such fish as the halibut, the oil is so intimately bound in cellular structure of the liver and other viscera that it cannot be readily extracted by simple means, such as could be employed on the deck of fishing boats at sea.

In the prior art, attempt has been made to solve this problem by removing the viscera from the fish aboard fishing vessels, packing them in metal cans, and chilling these metal cans in ice. While this attempted method of preservation is undoubtedly better than no preservation at all, it is still far removed from an ideal preservative in that the mild degree of chilling merely slows down the rate of deterioration but does not arrest it.

Another approach to the solution of this problem in the prior art has been the use of certain chemical preservatives, such as formaldehyde, sodium chloride and various other organic and inorganic preservatives, which tend to toughen and harden the tissues. While undoubtedly chemical preservatives of this kind can and do effect preservation of a sort by toughening and hardening the tissues, they tend to increase the difficulties of efficient extraction of the viscera when they arrive at the plant on shore.

None of the aforementioned prior art procedures has, therefore, been fully efficacious in so preserving the viscera of fish for extended periods at sea that the oil subsequently extracted by efficient methods ashore will be wholesome, of light color and of good quality from the point of view of taste, odor, freedom of fatty acids and vitamin potency.

It is, therefore, an object of this invention to so preserve tissues containing vitamin-bearing oil, and particularly viscera of fish, for extended periods of time so that the oil subsequently extracted will be wholesome, of light color and of good quality from the point of view of taste, odor, vitamin potency and freedom of fatty acids.

Another object of the invention is to provide preserved tissues containing vitamin-bearing oils, particularly viscera of fish, which are capable of being kept for extended periods of time and which will yield an oil, will be wholesome, of light color and of good quality from the point of view of taste, odor, vitamin potency and freedom of fatty acids.

Other objects of the invention will become apparent from the following description and appended claims.

In viscera, I have found that the reaction of the medium has an important influence on the activity of enzymes. I have found generally that, when the range of hydrogen ion concentration is between pH 1.5 to pH 9.0, there will be enzymic activity.

Certain chemical substances may be injurious to one enzyme or type of micro-organism and yet comparatively harmless to another.

In the instant invention, I treat the tissues containing vitamin-bearing oils so that the hydrogen ion concentration thereof is increased in excess of pH 9.0 and at the same time inhibit, i. e. kill or arrest, the action of all the enzymes and bacteria which produce the undesired results.

In accordance with the principles of the instant invention, tissues containing vitamin-bearing oils, such as fish viscera, are treated with certain substances, hereinafter more fully described, whereby said fish viscera are preserved for extended periods of time so that enzymic activity is inhibited, the greater part of the microbial population is killed and the rate of growth of the survivors greatly reduced, the original vitamin A potency is maintained and rancidity inhibited.

The substances contemplated by this invention, and above referred to, are alkalis which have the effect of producing such a high concentration of hydroxyl ions (in excess of pH 9.0) which tend to suppress enzyme action and at the same time kill or inactivate the bacteria without deleteriously affecting the desired properties in the tissues or oil extracted therefrom. The preferred alkalis are those which, in addition to producing the desired hydrogen ion concentration, are also cheap, non-toxic and harmless so that if accidentally spilled on the edible fish no harm will be done. In addition, the preferred alkalis do not change the appearance of the viscera, particularly in the case of livers. Though various alkalis may be used, I have found that soda ash (crude sodium carbonate) or pearl ash (potassium carbonate) possesses the aforementioned properties and, therefore, is admirably suited for the purposes of this invention.

As illustrative examples of other alkalis capable of use in the instant invention may be mentioned alkali hydroxides, such as, for example, sodium hydroxide, potassium hydroxides; alkali salts, such as trisodium phosphate; and ammonia and substituted ammonia compounds, such as ammonium hydroxide, methyl amine, and ethyl amine.

The quantity of the alkali which is employed in accordance with the principles of this invention may vary. The precise minimum quantity can be determined by simple empirical tests. In the case of soda ash or pearl ash, I have found that a quantity constituting 4% to 10% or higher of the alkali, based on the weight of the fish viscera, give satisfactory results. Optimum results are secured when 5% soda ash or pearl ash, based on the weight of the viscera, is employed.

In carrying out the process constituting another phase of the invention, strictly fresh viscera (livers, intestines, plioric caeca, etc.), immediately after they are taken from the fish, are put in suitable containers, such as tight barrels, tin cans, tubs or the like, and among them is sprinkled the dry selected alkali. Precautions and care should be taken to distribute the alkali well and uniformly throughout the viscera in the container. When the containers are filled, they may be closed and stored so that sunlight is excluded therefrom. Alternatively, the cans may be tightly closed.

Since the viscera are in the fresh condition, it is obvious that they are also in the raw or uncooked state.

Though it is not essential that viscera, preserved as herein described, be refrigerated by artificial means, it is always advantageous and desirable to keep them as cool as can be done, particularly if the process is practiced aboard fishing vessels.

From the foregoing, it is clear that the instant method is very simple and so easy to perform that it can be easily carried out at sea, even by unskilled persons under the rough conditions prevailing at sea.

When viscera is preserved as herein described, the product is suitable in every way for the extraction of vitamin-bearing oils of exceptionally high quality, light color, mild and agreeable odor and taste, and with the vitamin potency fully retained. In addition to securing the results aforementioned, the viscera are preserved for extended periods of time and over a relatively wide range of temperature, such as, for example, 25° to 50° C. When livers are treated with the preservatives contemplated by this invention, and particularly soda ash, the product has all the appearances of the raw fresh liver. There is no putrefaction, odor or disintegration of the cells.

Since it is obvious that various changes and modifications may be made in the above description without departing from the nature or spirit thereof, this invention is not restricted thereto except as set forth in the appended claims.

I claim:

1. A process of preserving fresh fish viscera containing vitamin-bearing oil which consists in applying an alkali to said fresh viscera in an amount to produce such a high hydroxyl ion concentration as will inhibit the action of the enzymes of the viscera tissue and the action of the bacteria which cause decomposition without deleteriously affecting the desired properties of the viscera tissue or the oil extracted therefrom.

2. A process of preserving fresh fish viscera containing vitamin-bearing oil which consists in applying an alkali in dry form to said fresh viscera in an amount to produce such a high hydroxyl ion concentration as will inhibit the action of the enzymes of the viscera tissue and the action of the bacteria which cause decomposition without deleteriously affecting the desired properties of the viscera tissue or the oil extracted therefrom.

3. A process of preserving fresh fish viscera containing vitamin-bearing oil which consists in applying an alkali metal carbonate to said fresh viscera in an amount to produce such a high hydroxyl ion concentration as will inhibit the action of the enzymes of the viscera tissue and the action of the bacteria which cause decomposition without deleteriously affecting the desired properties of the viscera tissue or the oil extracted therefrom.

4. A process of preserving fresh fish viscera containing vitamin-bearing oil which consists in sprinkling a dry alkali metal carbonate on the fresh viscera to be preserved, the amount of said carbonate being such as to produce a hydroxyl ion concentration as will inhibit the action of the viscera tissue and the action of the bacteria which cause decomposition without deleteriously affecting the desired properties of the viscera tissue or the oil extracted therefrom.

5. A process of preserving fresh fish viscera containing vitamin-bearing oil which consists in applying an alkali to said fresh viscera in an amount from 4% to 10% based on the weight of the viscera, said alkali producing such a high hydroxyl ion concentration as will inhibit the action of the enzymes of the viscera tissue and the action of the bacteria which cause decomposition without deleteriously affecting the desired properties of the viscera tissue or the oil extracted therefrom.

6. A process of preserving fresh fish viscera containing vitamin-bearing oil which consists in applying an alkali metal carbonate to said fresh viscera in an amount from 4% to 10% based on the weight of the viscera, said carbonate producing such a high hydroxyl ion concentration as will inhibit the action of the enzymes of the viscera tissue and the action of the bacteria which cause decomposition without deleteriously affecting the desired properties of the viscera tissue or the oil extracted therefrom.

7. A process of preserving fresh fish viscera containing vitamin-bearing oil which consists in applying an alkali metal carbonate to said fresh viscera in an amount of 5% based on the weight of the viscera, said carbonate producing such a high hydroxyl ion concentration as will inhibit the action of the enzymes of the viscera tissue and the action of the bacteria which cause decomposition without deleteriously affecting the desired properties of the viscera tissue or the oil extracted therefrom.

8. A process of preserving fresh fish viscera containing vitamin-bearing oil which consists in sprinkling a dry alkali metal carbonate on the fresh viscera to be preserved, the amount of said carbonate being from 4% to 10% based on the weight of the viscera, said carbonate producing such a high hydroxyl ion concentration as will inhibit the action of the enzymes of the viscera tissue and the action of the bacteria which cause decomposition without deleteriously affecting the desired properties of the viscera tissue or the oil extracted therefrom.

9. A process of preserving fresh fish viscera containing vitamin-bearing oil which consists in sprinkling a dry alkali metal carbonate on the fresh viscera to be preserved, the amount of said carbonate being 5% based on the weight of the viscera, said carbonate producing such a high hydroxyl ion concentration as will inhibit the action of the enzymes of the viscera tissue and the action of the bacteria which cause decomposition without deleteriously affecting the desired properties of the viscera tissue or the oil extracted therefrom.

10. A method of preserving fresh fish viscera containing vitamin-bearing oil which consists in increasing the hydroxyl ion concentration to a pH in excess of 9.0.

11. A method of preserving fresh fish viscera containing vitamin-bearing oil which consists in treating the fresh viscera with an alkali in an amount to increase the hydroxyl ion concentration to a pH in excess of 9.0 to inhibit the action of the enzymes and bacteria which cause decomposition without deleteriously affecting the desired properties in the viscera or the oil extracted therefrom.

12. A method of preserving fresh fish viscera containing vitamin-bearing oil which consists in treating the said fresh viscera with an alkali metal carbonate in an amount to increase the hydroxyl ion concentration to a pH in excess of 9.0 to inhibit the action of the enzymes and bacteria which cause decomposition without deleteriously affecting the desired properties in the viscera or the oil extracted therefrom.

13. A method of preserving fresh fish viscera containing vitamin-bearing oil which consists in sprinkling the fresh viscera with an alkali metal carbonate in an amount to increase the hydroxyl ion concentration to a pH in excess of 9.0 to inhibit the action of the enzymes and bacteria which cause decomposition without deleteriously affecting the desired properties in the viscera or the oil extracted therefrom.

ROBERT H. BEDFORD.